United States Patent
Gibson, Jr. et al.

(10) Patent No.: US 9,556,905 B2
(45) Date of Patent: Jan. 31, 2017

(54) SPLIT BEARING ASSEMBLIES, AIR-COOLED HEAT EXCHANGERS AND RELATED METHODS

(75) Inventors: Gary E. Gibson, Jr., The Woodlands, TX (US); Craig Watkinson, Littleover Derby (GB); Niles Hlavacek, Deer Park, TX (US)

(73) Assignee: Green, Tweed Technologies, Inc., Wilmington, DE (US)

( * ) Notice: Subject to any disclaimer, the term of this patent is extended or adjusted under 35 U.S.C. 154(b) by 0 days.

(21) Appl. No.: 12/648,002

(22) Filed: Dec. 28, 2009

(65) Prior Publication Data

US 2010/0163219 A1 Jul. 1, 2010

Related U.S. Application Data

(63) Continuation-in-part of application No. 12/493,376, filed on Jun. 29, 2009, now abandoned.

(60) Provisional application No. 61/076,481, filed on Jun. 27, 2008.

(51) Int. Cl.
| | | |
|---|---|---|
| *F16C 33/74* | (2006.01) | |
| *F16C 33/20* | (2006.01) | |
| *F16J 15/32* | (2016.01) | |

(52) U.S. Cl.
CPC .............. *F16C 33/20* (2013.01); *F16C 33/74* (2013.01); *F16J 15/3236* (2013.01); *F16J 15/3268* (2013.01); *Y10T 29/4935* (2015.01)

(58) Field of Classification Search
CPC ................................. F16C 17/02; F16C 33/74
USPC ............... 384/130, 138–153, 276, 295, 428, 192,384/206–214, 432–434; 277/551, 533, 543
See application file for complete search history.

(56) References Cited

U.S. PATENT DOCUMENTS

| | | | | |
|---|---|---|---|---|
| 888,101 | A * | 5/1908 | Kuper | 384/192 |
| 2,886,379 | A * | 5/1959 | Small | 384/207 |
| 2,983,529 | A * | 5/1961 | Price | 277/346 |
| 3,642,290 | A * | 2/1972 | Millsap | 277/551 |
| 3,746,415 | A * | 7/1973 | Thomson | 384/291 |
| 3,819,242 | A * | 6/1974 | Robinson | 384/152 |
| 4,415,166 | A | 11/1983 | Beia | |
| 4,739,997 | A * | 4/1988 | Smetana | 384/131 |
| 4,863,177 | A | 9/1989 | Rockwood et al. | |
| 5,243,815 | A | 9/1993 | Maier et al. | |
| 5,265,890 | A | 11/1993 | Balsells | |
| 5,667,225 | A * | 9/1997 | Vollmer et al. | 277/563 |
| 5,799,953 | A * | 9/1998 | Henderson | 277/554 |
| 2005/0158165 | A1 | 7/2005 | Chiba et al. | |
| 2008/0118319 | A1 | 5/2008 | Sugita et al. | |

FOREIGN PATENT DOCUMENTS

WO    WO 95/25903    * 9/1995 ............. F16C 33/10

OTHER PUBLICATIONS

PCT International Preliminary Report on Patentability, Jan. 5, 2011, 1 page and PCT Written Opinion of the International Searching Authority, Jul. 31, 2009, 7 pages.

* cited by examiner

*Primary Examiner* — Thomas R. Hannon
(74) *Attorney, Agent, or Firm* — Flaster/Greenberg P.C.

(57) ABSTRACT

Bearing assemblies are provided that include a bearing having a split bearing body that includes a material such as a composite or a thermoplastic; and at least one recess configured for receiving a rotary seal assembly; and at least one rotary seal assembly comprising an energizing component. The bearing assemblies may further include at least two recesses and/or an energizing component that is an o-ring.

12 Claims, 15 Drawing Sheets

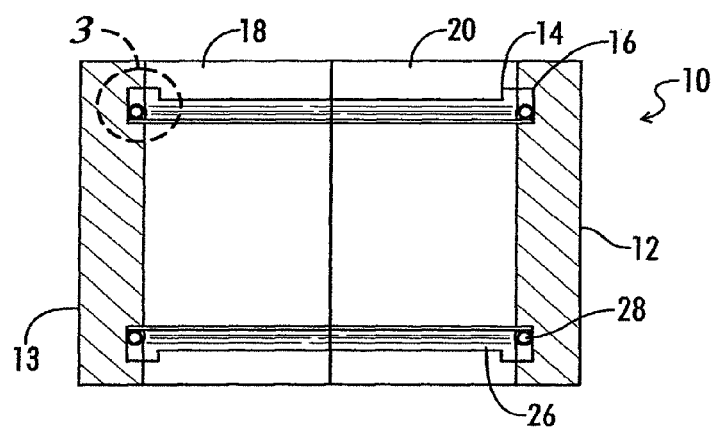
FIG. 1
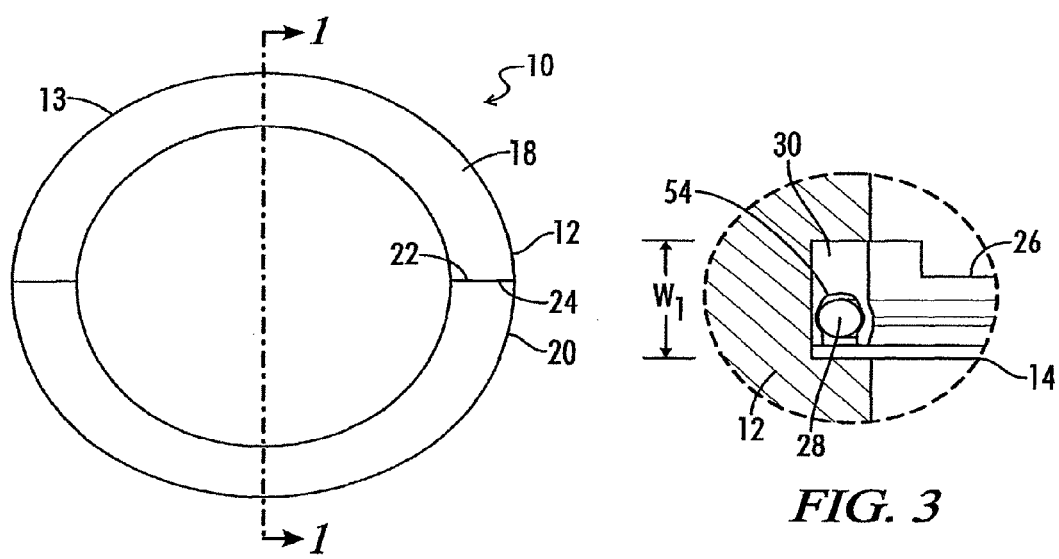
FIG. 2
FIG. 3

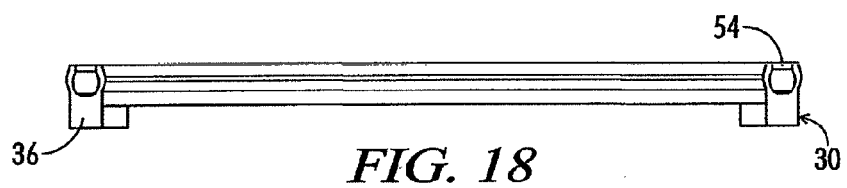
FIG. 18
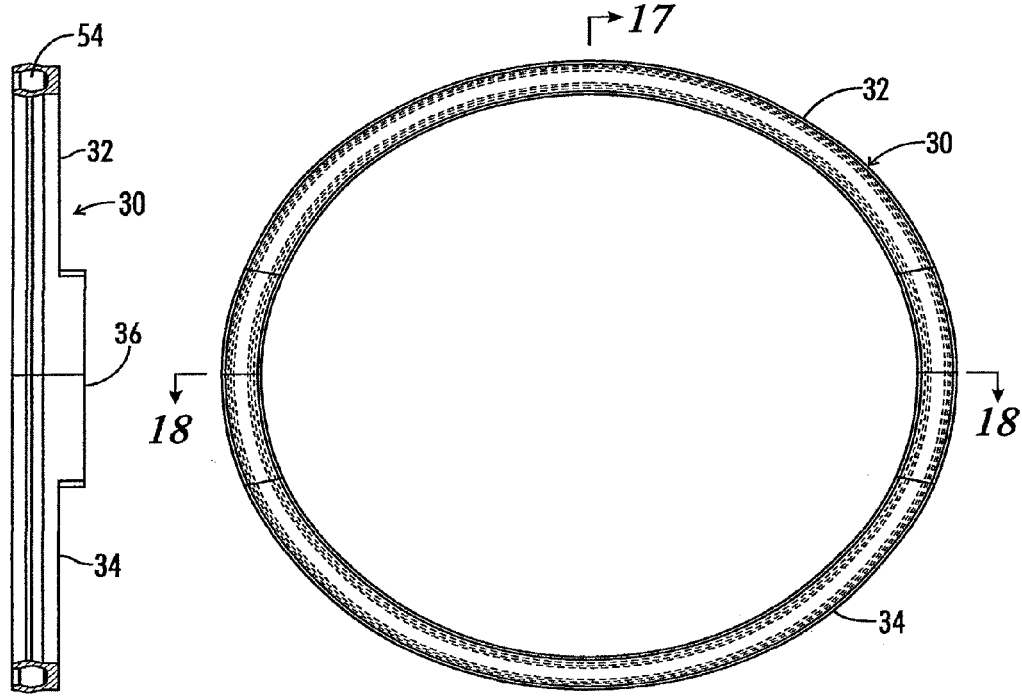
FIG. 17
FIG. 16

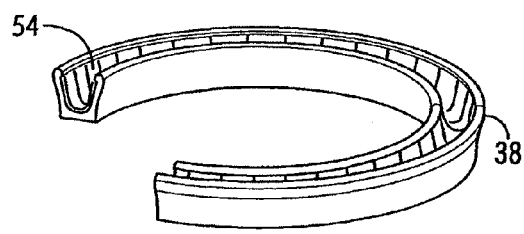
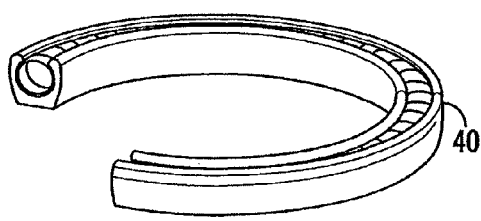
FIG. 20A  FIG. 20B
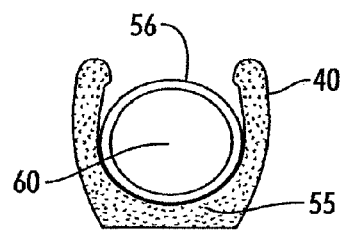
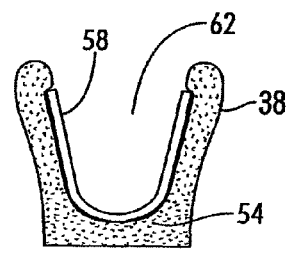
FIG. 21A  FIG. 21B
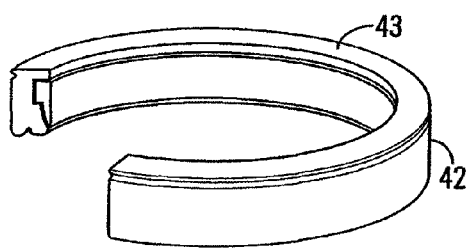
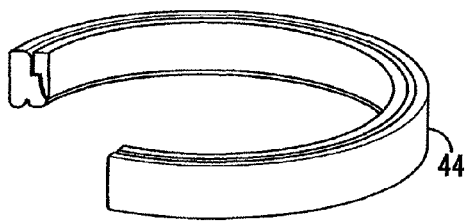
FIG. 22A  FIG. 22B

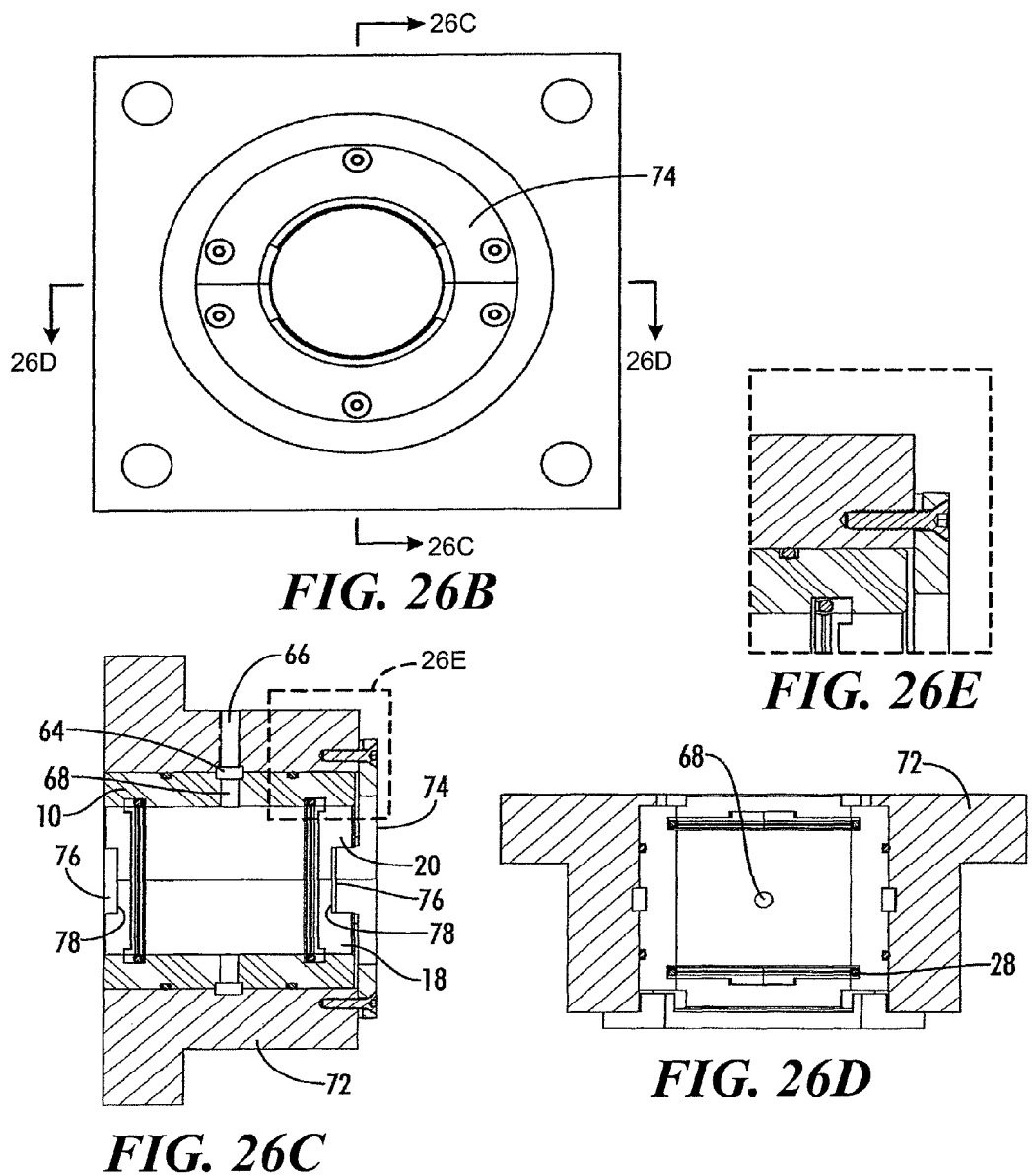

SPLIT BEARING ASSEMBLIES, AIR-COOLED HEAT EXCHANGERS AND RELATED METHODS

CROSS REFERENCE TO RELATED APPLICATION

This application claims priority under 35 U.S.C. §119 as a continuation-in-part application to U.S. patent application Ser. No. 12/493,376, filed Jun. 29, 2009 now abandoned, which in turn claims priority to U.S. Provisional Patent Application Ser. No. 61/076,481, filed Jun. 27, 2008, the contents of each of which are incorporated herein by reference.

BACKGROUND OF THE INVENTION

Air-cooled heat exchangers and other similar types of heating and cooling equipment are used in many industries, including oil refineries, petrochemical manufacturing, drilling and reservoir applications, natural gas manufacture, transportation systems, the chemical manufacturing industry, transportation industry and various industrial uses. Essentially, they are used wherever heat exchange equipment may be implemented and required to maintain constant temperature in equipment or climate control in manufacturing and processing and/or in transporting materials that must be kept at constant temperature.

One problem in the art with respect to such apparatus, particularly with respect to air-cooled heat exchangers, is that the equipment typically involves use of grease-lubed, sealed ball bearings, which are situated on the top portion or surface of a heat exchanger. The lubricants and bearing assemblies are thus constantly heated when the fan pulls heat from the heat exchanger. The fans pull cool air across the fins to extract heat from fluid in the heat exchanger. The lubricants are not only affected by heat, but also are affected by the work that is done by the individual balls in the ball bearing assembly. Bearings typically fail in approximately eighteen months of service. Failure contributes to high expenses associated with replacement due to peripheral equipment for associated with disassembling the fan to replace the bearings. Thus, current costs can be about $20,000 for a single replacement. Similar replacement and failure costs can be seen in various types of heating and cooling equipment throughout the various industries noted.

There is a need in the art for a bearing assembly that will enable a longer life for bearings between failures as well as that will allow for an easier replacement process.

BRIEF SUMMARY OF THE INVENTION

The foregoing need in the art is satisfied by the present invention which enables for a longer life for bearings for use in heating and cooling industrial uses such as air-cooled heat exchangers and the like than is typically experienced in prior art bearings having lubricated ball bearings. The invention further allows for easier replacement between failures of bearings as associated parts, such as an air-cooling fan, will generally not require special disassembly as has been the case with many prior art bearings.

The invention includes a bearing assembly that has a bearing. The bearing includes a split bearing body that includes a material chosen from a composite or a thermoplastic; and at least one recess configured for receiving a rotary seal assembly. The bearing assembly further includes at least one rotary seal assembly that includes an energizing component. The energizing component may include an elastomeric material; for example, it may be an o-ring or other component that is made of elastomers(s).

Also included are bearing assemblies such as those described above, but which have a rotary seal assembly that is chosen from one or more of a split metal spring-energized seal assembly, a split rubber spring-actuated seal assembly or a split rotolip seal assembly. In an embodiment, the rotary seal assembly is a split metal spring-energized seal assembly that includes a seal assembly body having a first seal assembly body portion and a second seal assembly body portion. The first seal assembly body portion and the second seal assembly body portion each may have a generally semi-circular cross-sectional configuration when viewed in an axial direction of the bearing assembly so that when the first and the second seal assembly body portions are joined to form the seal assembly body, they also form a generally circular cross-sectional configuration in the axial direction of the bearing assembly. Further, the seal assembly body portions are shaped so as to define a groove within each of the first and the second seal assembly body portions, and the grooves in the first and the second seal assembly body portions together are configured to meet in generally facing engagement. The split metal spring-energized seal assembly also includes a spring element configured to be received within the grooves, the spring element having an opening configured so as to receive the energizing component. The energizing component is sized so as to fit within the opening in the spring element within the grooves in the first and the second seal assembly body portions so as to form a ball-and-socket o-ring configuration within the split metal spring-energized seal assembly.

The invention may also include bearing assemblies that include (a) a bearing having: a split bearing body; and at least two recesses, each configured for receiving a rotary seal assembly; and (b) at least two rotary seal assemblies that comprise an energizing component.

Also encompassed within the scope of the invention are air-cooled heat exchangers that include of more of the bearing assemblies described above.

Within the invention are also related methods of making and using the bearing assemblies and air-cooled heat exchangers, including methods of manufacturing an air-cooled heat exchanger by providing to the air-cooled heat exchanger a bearing assembly that includes any of the bearing assemblies described above.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. It should be understood that the invention is not limited to the precise arrangements and instrumentalities shown. In the drawings:

FIG. 1 is a cross-sectional, side-elevational view of an embodiment of a bearing body as shown in FIG. 2;

FIG. 2 is a top plan view of a bearing as in FIG. 1;

FIG. 3 is an enlarged partial view of a portion of FIG. 1;

FIG. 16 is a top plan view of the seal assembly body according to FIG. 15;

FIG. 17 is a cross-sectional, side-elevational view of the seal assembly body according to FIG. 15;

FIG. 18 is a cross-sectional side elevational view of the seal assembly body portion of the seal assembly body of FIG. 15;

FIG. 20A is a perspective representational view of a rotary seal assembly in the form of a spring-energized seal assembly for use in an embodiment of the bearing assembly according to the invention;

FIG. 20B is a perspective representational view of an alternative spring-energized seal assembly for use in an embodiment of the bearing assembly according to the invention;

FIG. 21A is a cross-sectional representational view of the seal assembly of FIG. 20A;

FIG. 21B is a cross-sectional representational view of the seal assembly of FIG. 20B;

FIG. 22A is a perspective representational view of a rotary seal assembly in the form of an energized rotary lip seal assembly for use in an embodiment of the bearing assembly according to the invention having a protective ring feature;

FIG. 22B is a perspective representational view of an alternative energized rotary lip assembly to that of FIG. 22A having no protective ring feature;

FIG. 26B is a front perspective view of the bearing plate assembly of FIG. 26A identifying the locations of the section lines A-A and B-B, which gave rise to the cross section views shown in FIGS. 26C and 26D, respectively;

FIG. 26C shows a cross section of the bearing assembly in a housing along section line A-A;

FIG. 26D shows a cross section of the bearing assembly in a housing;

FIG. 26E shows a detail portion of FIG. 26C;

DETAILED DESCRIPTION OF THE INVENTION

Figure 4:
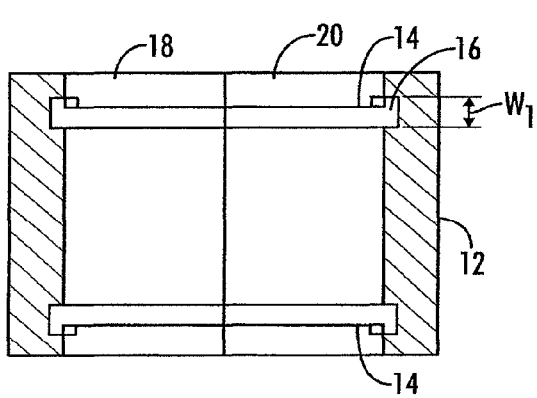
FIG. 4 is a cross-sectional side-elevational view of a bearing body portion of the bearing assembly as shown in FIG. 5.
Figure 5:
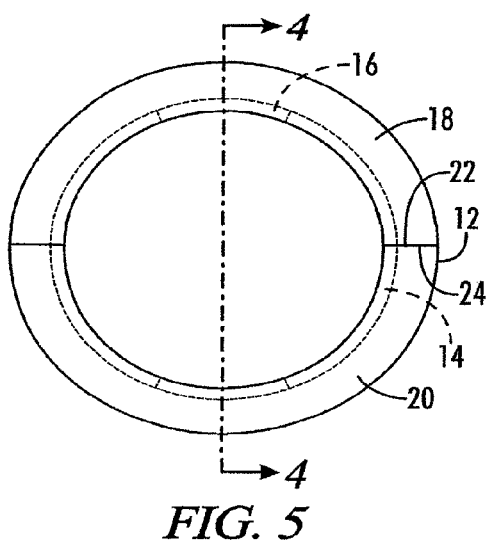
FIG. 5 is a top plan view of a bearing body as shown in FIG. 4.
Figure 6:
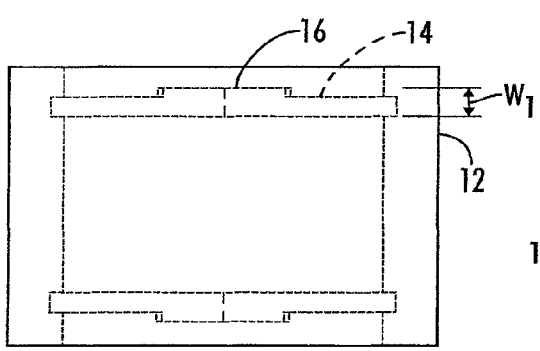
FIG. 6 is a side elevational view of a bearing body shown in FIG. 4.
Figure 7:
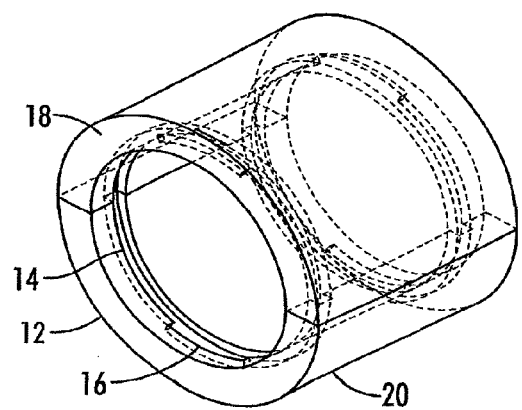
FIG. 7 is a perspective view of the bearing body of FIG. 4.
Figure 8:
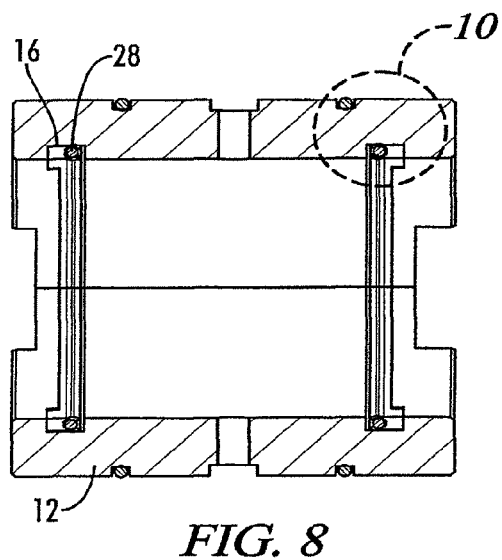
FIG. 8 is a cross-sectional, side-elevational view of an embodiment of a bearing as shown in FIG. 9.
Figure 9:
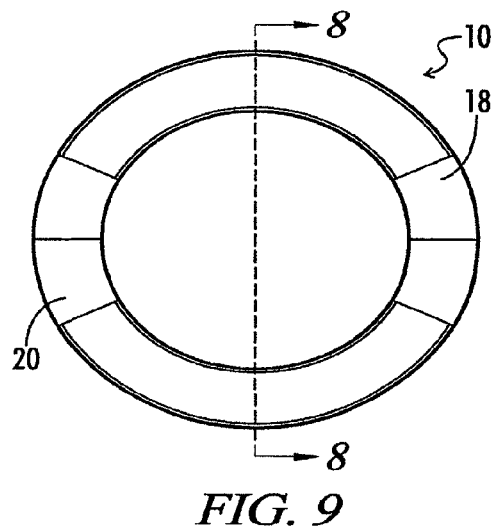
FIG. 9 is a top plan view of a bearing as in FIG. 8.
Figure 10:
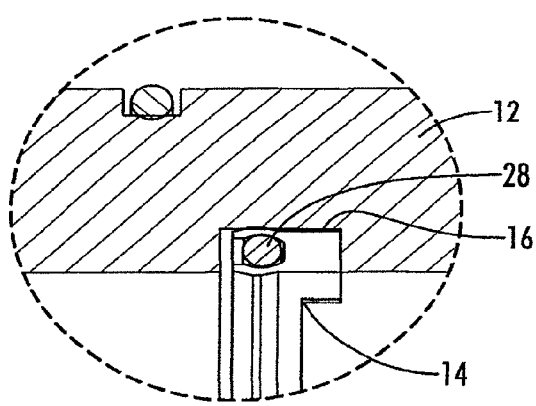
FIG. 10 is an enlarged partial view of a portion of FIG. 8.
Figure 11:
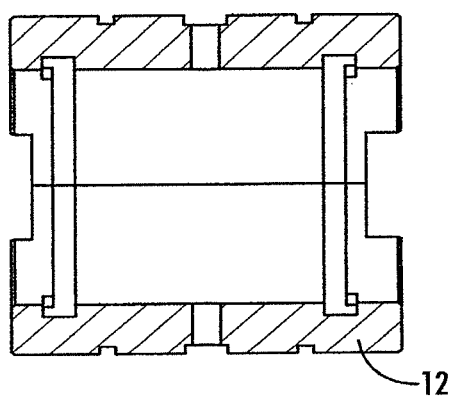
FIG. 11 is a cross-sectional side-elevational view of a bearing body portion of the bearing assembly of FIG. 12.
Figure 12:
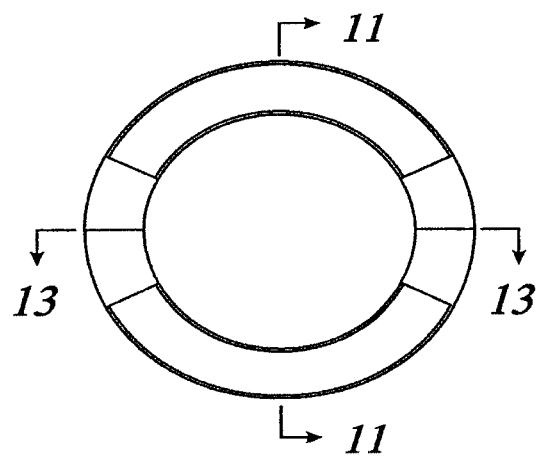
FIG. 12 is a top plan view of a bearing body as shown in FIG. 11.
Figure 13:
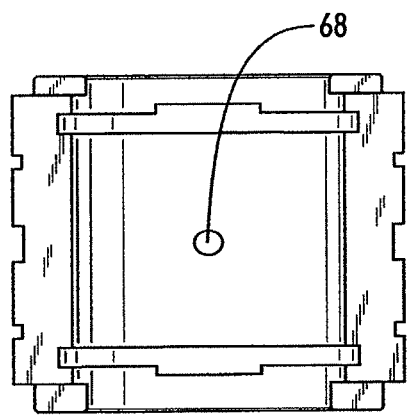
FIG. 13 is a side elevational view of a bearing body shown in FIG. 11.
Figure 14:
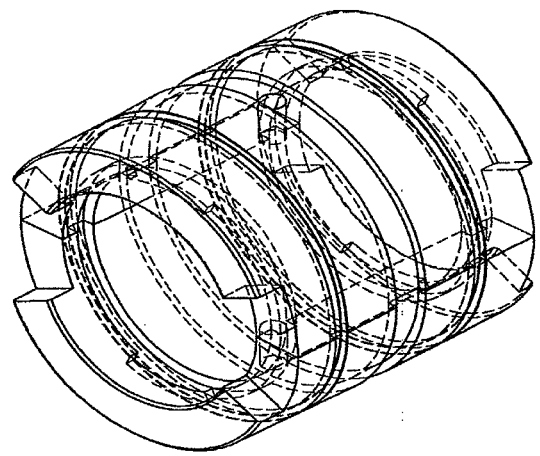
FIG. 14 is a perspective view of the bearing body of FIG. 11.
Figure 15:
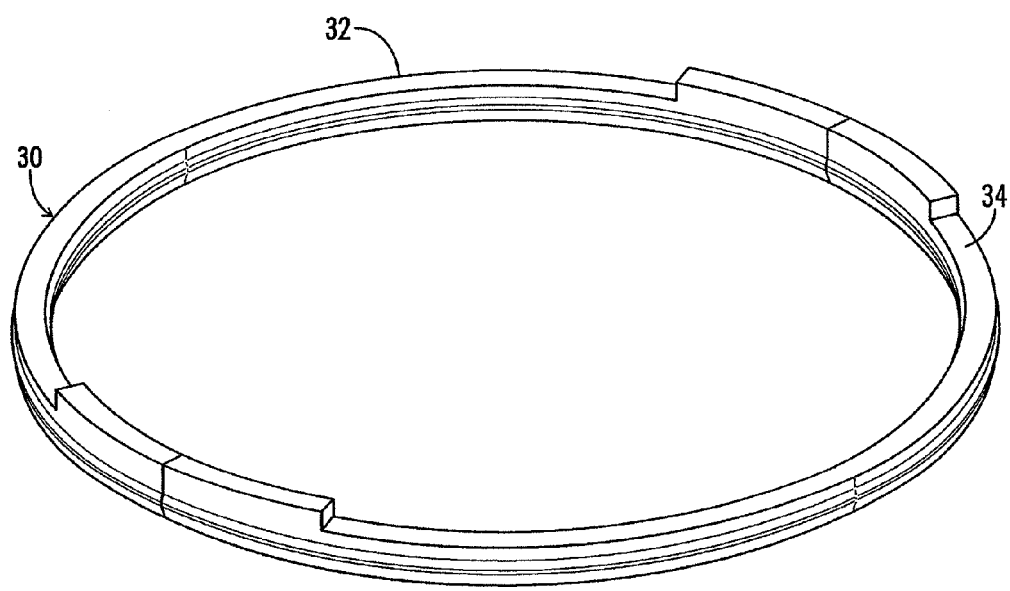
FIG. 15 is a perspective view of a seal assembly body for use in a bearing according to the embodiment shown in FIG. 1.
Figures 19, 19A:
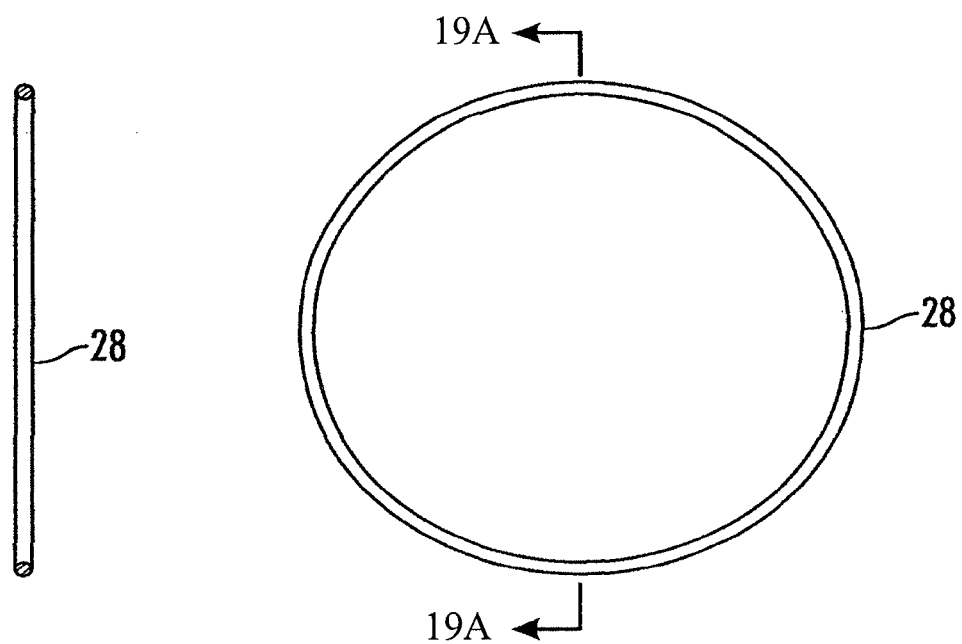
FIG. 19 is a top plan view of an energizing component in the form of an o-ring.
FIG. 19A is a side-elevational cross-sectional view of the energizing component of FIG. 19.

Embodiments of the invention are described herein with reference to the accompanying non-limiting drawings. As used herein, "right" and "left," "upper" and "lower," "inner" and "outer," "top" and "bottom," and words of similar import or pertaining to direction and arrangement of elements are used for convenience in viewing the drawings and are not meant to be limiting.

The bearing assembly of the invention will be explained first with reference to FIGS. 1-3. The bearing assembly, generally shown as 10 includes a bearing body 12. The bearing body is preferably shaped so as to have a generally cylindrical shape as shown. However, it should be understood that the height, circumference and shape of the bearing body may be adapted so as to fit for its particular application in a given piece of equipment. The outer surface 13 of the bearing body is preferably shaped so as to fit within a bearing seat or other opening in a device into which the bearing body will be used (not shown). The bearing body includes at least one recess 14 configured for receiving a rotary seal assembly 26 as described herein. The bearing body is best shown as a separate component in FIGS. 4-14. A recess 14 preferably has at least one, and preferably two enlarged widths w1 in an area(s) 16 within the recess. This area can accommodate a locking portion in a rotary seal assembly. The bearing body is also preferably a split bearing body having in one embodiment two longitudinally extending halves split so that the split line runs in the axial direction of the bearing body. The split portions 18, 20 meet in preferably facing engagement along their respective facing surfaces 22, 24 for example (although it will be understood that there are two such facing surfaces). By having a split body, the bearing body assembly is easier to assemble and replace parts.

Uniquely, the present invention includes a bearing body formed from a thermoplastic or composite material. Preferred material(s) for use in forming the bearing body 12 of the assembly 10 herein, include polymeric materials (filled or unfilled) such as perfluoroalkoxy and modified perfluoroalkoxy polymers, polyarylene ether ketones (PAEKs) and their derivatives, including preferred PAEKs such as polyetherether ketone (PEEK), polyether ketone ketone (PEKK) or polyether ketone (PEK). Other preferred materials include the commercial plastic, Arlon®, as well as other thermoplastic materials such as various polyamides (Nylons®), polytetrafluoroethylene (PTFE), polyetherimides, polysulfones, polyethersulfones, and derivatives and copolymers of these various materials.

Such materials may be altered by various filler materials as is known in the art, and other additives, such as plasticizers, lubricants, metal powders, rheology modifiers, fibers, nanotubes, micropowders, particulates, carbon black, polymeric particle fillers, and other similar polymeric additives. Examples may include, but are not limited to, glass (spheres or fibers), silicates, fiberglass, calcium sulfate, asbestos, boron fibers, ceramic fibers, polyamide fibers (such as those sold under the trademark KEVLAR, available from E.I. du Pont de Nemours & Co., 1007 Market Street, Wilmington, Del., 19898, U.S.A.), aluminum hydroxide, barium sulfate, calcium carbonate, magnesium carbonate, silica, alumina, aluminum nitride, borax (sodium borate), activated carbon, pearlite, zinc terephthalate, Buckeyballs, graphite, talc, mica, Hectorite, silicon carbide platelets, wollastonite, calcium terephthalate, silicon carbide whiskers, or fullerene tubes, depending on the specific properties desired in the end product. In some embodiments, it may be preferred that material is a composite containing carbon fibers (including chopped, long, and/or continuous fibers), carbon whiskers, carbon balls or carbon nanotubes.

In an embodiment, the bearing body may be treated with a coating layer of a material that reduces friction and/or wear, thereby extending the life of the body. Such materials may include any known or to be developed in the art and may be applied as a paint on coating, spray coating, dip coating, etc. Suitable materials may include any and all known in the art, including, for example, FEP, PTFE, SilverStone®, PFA, Xylan®, Kynar®, nylon, polyesters and epoxies. Other portions of the bearing assembly may be coated with these materials, if desired.

The bearing assembly 10 further includes at least one, and preferably two or more, rotary seal assembly(ies) 26, each such assembly 26 having an energizing component 28. The rotary seal assembly(ies) are arranged so as to sit within the at least two recesses 14 which are configured for receiving such rotary seal assembly(ies). As shown in FIGS. 1 and 3, a rotary seal assembly 26 and energizing component 28 fit within recess 14. The rotary seal assembly has a seal assembly body 30 which is preferably also split for removal and installation of its sealing component and which works with the energizing component to form the assembly. The seal assembly body is shown as a separate component in FIGS. 8-14. The seal assembly body 30 preferably has a first portion 32 and a second portion 34. Each of the seal assembly body portions preferably has an enlarged portion 36. The enlarged portions 36 of the seal assembly body portions 32, 34 are configured so as to fit within an enlarged portion 16 of the recess(es) 14 of the bearing body. In this embodiment, the enlarged portions 36 are areas for joining the assembly body portions, wherein any locking or joining mechanism is acceptable for this purpose.

While a preferred embodiment of the rotary seal assembly 26 is shown herein may be a split metal spring-energized seal assembly, other suitable rotary seal assemblies may be substituted herein and have good operation in the present design. The recesses 14 in the bearing body 12 may be altered in configuration to accommodate various rotary seal assembly designs. For example, instead of a split metal spring-energized seal assembly, a split rubber spring-actuated seal assembly or a split rotolip seal assembly may be used. Such assemblies are known and commercially available.

Figure 23:
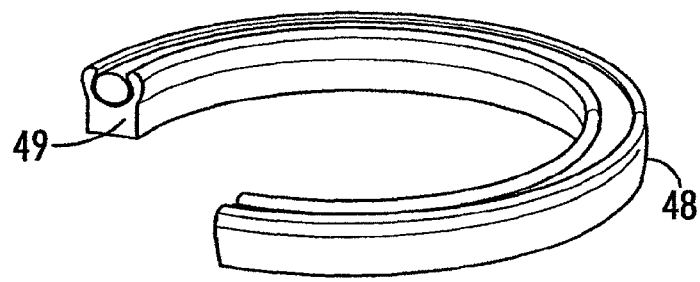
FIG. 23 is a perspective representational view of rotary seal assembly in the form of a rubber spring-actuated seal assembly for use with an embodiment of the bearing assembly according to the invention.

Exemplary split spring-energized seal assemblies 38, 40 are shown in representational perspective view with varied cross-sectional configurations in FIGS. 20a, 20b and 21a, 21b, wherein the spring-energized assembly 38 has an open configuration spring actuator and the spring energized assembly 40 has a closed spring actuator, wherein the spring actuator keeps the energizing component held within the spring element in firm placement in the recesses of the bearing body. Note that split lines are not readily visible in the representational drawings shown in FIGS. 21-22, but a split in the assembly at least in the jacketed body is preferred. Such spring-energized assemblies are available from Greene, Tweed and Company, Inc. of Kulpsville, Pa. as MSE® Seals. Further alternative spring-energized rotary lip seal assemblies 42, 44 which may be used in place of the spring-energized assemblies as shown in FIGS. 20a-21b, are shown in FIGS. 23a, 23b. In FIG. 23a, the spring-energized rotary lip assembly includes a protective ring feature 43 that can be adapted for certain uses. A further example rotary seal assembly 48 is shown in FIG. 23, wherein the assembly is a split rubber, spring-actuated seal assembly. The rotary seal assembly 48 may include a backup ring. The rotary seal assemblies of FIGS. 22-23 are also commercially available from Greene, Tweed and Company, Inc. of Kulpsville, Pa. as Enerlip® and Metric RSA Seal®, respectively.

Figure 24A:
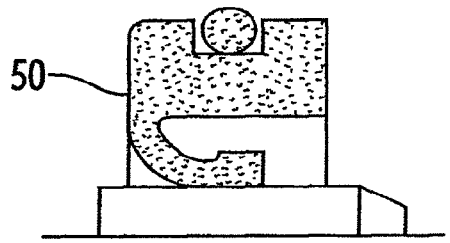
FIG. 24A is cross-sectional view of a rotary seal assembly in the form of a rotary lip assembly for use in an embodiment of the bearing assembly according to the invention.
Figure 24B:
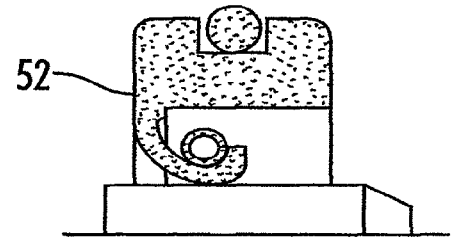
FIG. 24B is a cross-sectional view of an alternative rotary seal assembly in the form of a rotary lip assembly as an alternative to FIG. 24A having an energizing element.
Figure 25A:
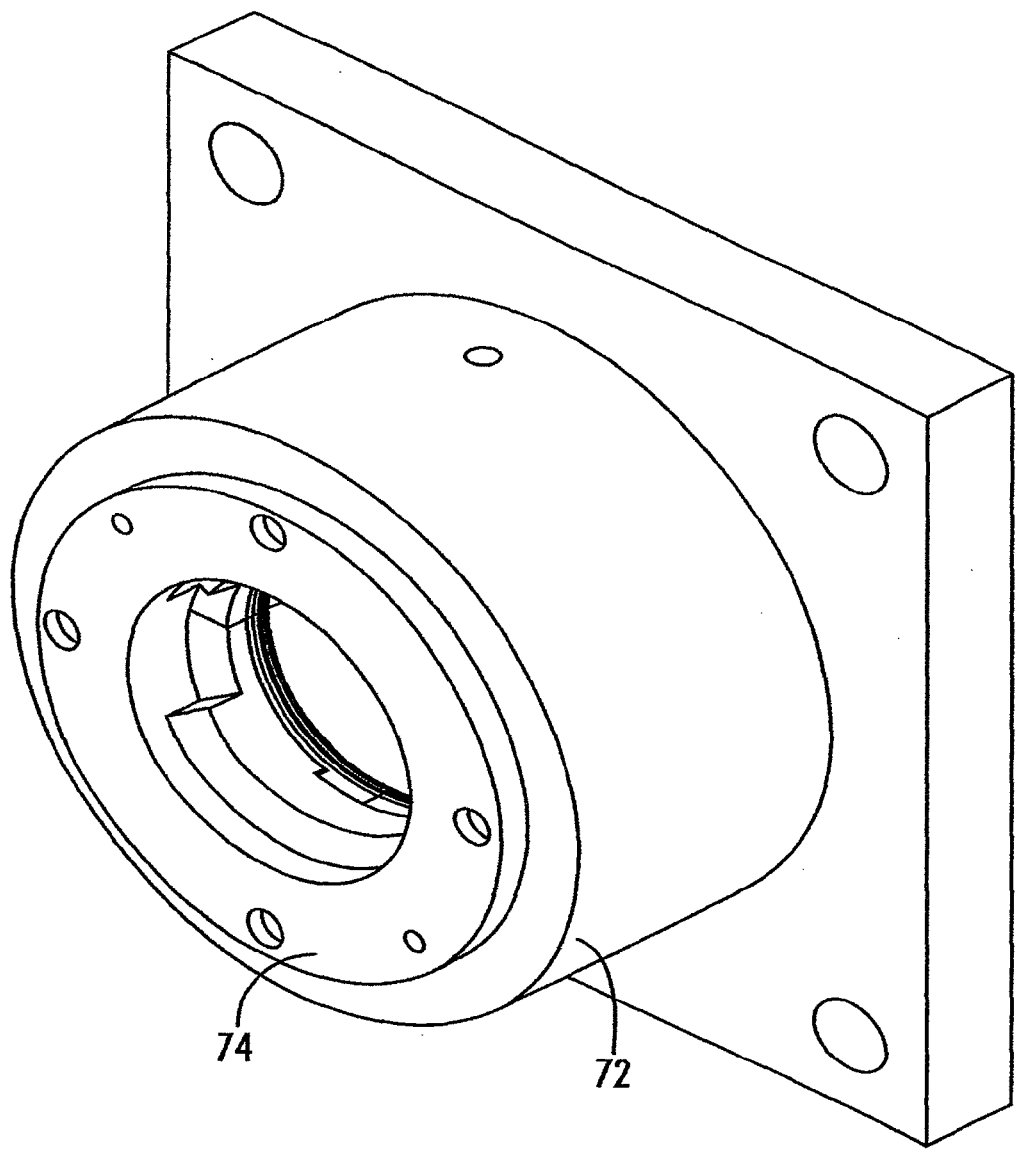
FIG. 25A is a right side oriented perspective view of a bearing assembly contained in a housing having a keying feature in the cap and housing.
Figure 25B:
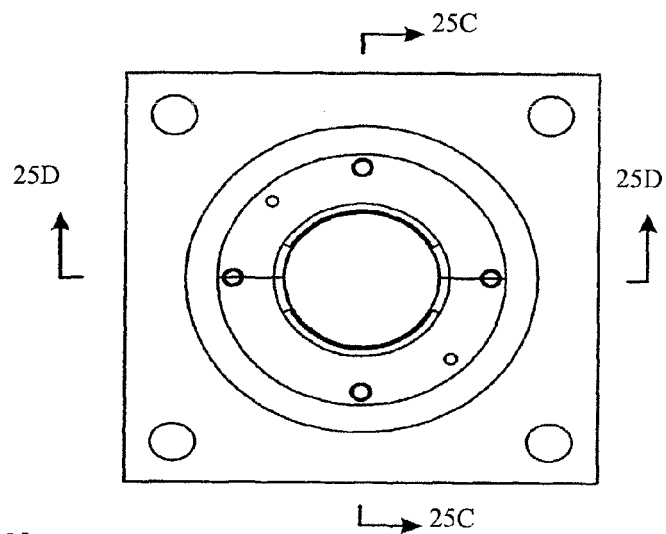
FIG. 25B is a front perspective view of the bearing plate assembly of FIG. 25A identifying the locations of the sections, which are shown in FIGS. 25C and 25D, respectively.
Figure 25C:
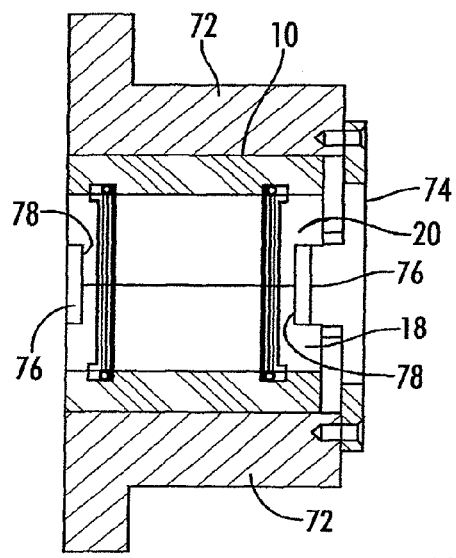
FIG. 25C shows a cross section of the bearing assembly in a housing.
Figure 25D:
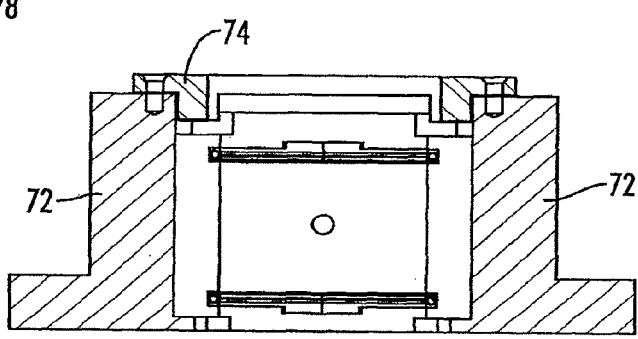
FIG. 25D shows a cross section of the bearing assembly in a housing.

FIGS. 24a and 24b show cross-sectional views of unreinforced and reinforced rotary lip assemblies. Such rotary seal assemblies as shown in FIG. 24 are commercially available.

Most preferred are the MSE split spring-energized seal assembly as described herein, wherein the seal assembly body 30 has first seal assembly body portion 32 and second seal assembly body portion 34. The first seal assembly body portion 32 and the second seal assembly body portion 34 each preferably have a generally semi-circular cross-sectional configuration as shown in FIGS. 1, 3, 8, 10, and 15-18 when viewed in an axial direction of the bearing assembly so that when the first and the second seal assembly body portions 32, 34 are joined to form the seal assembly body, they also form a generally circular cross-sectional configuration in the axial direction of the bearing assembly 10. Thus, the seal assembly body portions 32, 34 are shaped so as to define a groove 54 within each of the first and the second seal assembly body portions. The grooves in the first and the second seal assembly body portions 32, 34 together are configured to meet in generally facing engagement when the seal assembly body portions are joined.

A spring element such as spring elements 56, 58 in FIGS. 21a, 21b which are configured to be received within the grooves 54, 55 is preferably part of the spring actuated assembly. The spring elements 56, 58 preferably also have respective openings 60, 62 configured so as to receive the energizing component. Thus, a closed or open spring element may be used; however, a closed spring element is preferred.

The energizing component 28 is preferably an o-ring as shown in FIGS. 1, 3, 8, 10, etc. and the o-ring is sized so as to fit within the opening, such as opening 60 in the spring element within the groove in the first and the second seal assembly body portions 32, 34 so as to form a "ball-and-socket" o-ring configuration as shown in FIG. 3, within the split spring-energized seal assembly 30. The o-ring is preferably an elastomeric material of a variety of types of elastomers. Non-limiting examples of such elastomers include nitrile rubber, hydrogenated nitrile rubber, fluoroelastomers, tetrafluoroethylene/propylene rubber and perfluoroelastomers as well as variations, copolymers and derivatives of these materials and other similar materials known in the art.

In an embodiment, the bearing assembly is contained in a bearing and plate assembly that includes housing and a cap. With reference to FIGS. 25(*a-d*) and 26(*a-e*), the bearing assembly 10 is secured in housing 72 and cap 74. The housing and cap may independently include a keying feature 76 that may be in the form of male member (such as a tab or tabs). The corresponding split bearing portions 18, 20 are configured to have a mating portion 78 that interlocks with the keying feature(s) 76. When the assembly is incorporated into, for example, a heat exchanger, this configuration provides dual functionality of anti-rotation (if there should be contact with the rotating shaft of the fan) and axial securement during operation as the bearing assembly must be constrained within the housing during operation.

Figure 26A:
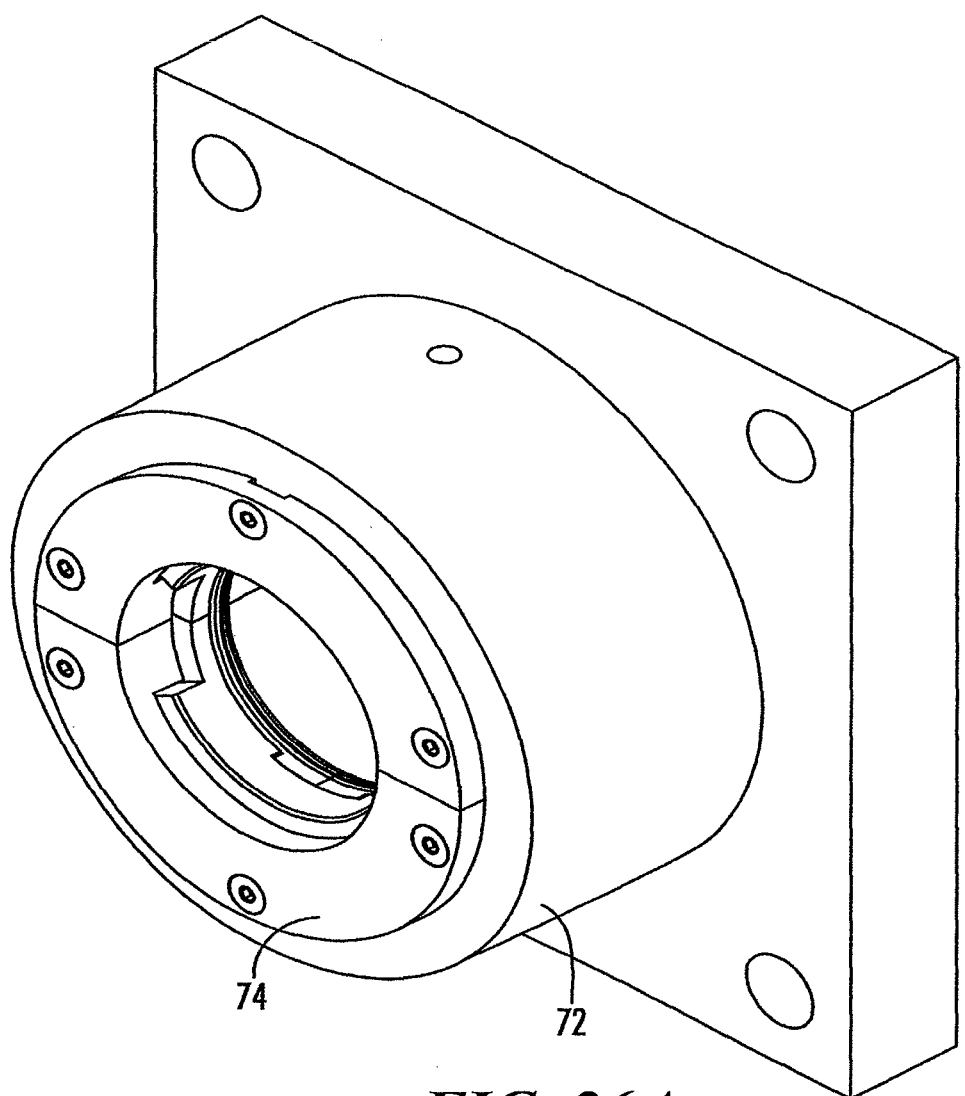
FIG. 26A is a right side oriented perspective view of a bearing assembly contained in a housing having a keying feature in the cap and housing.
Figure 27A:
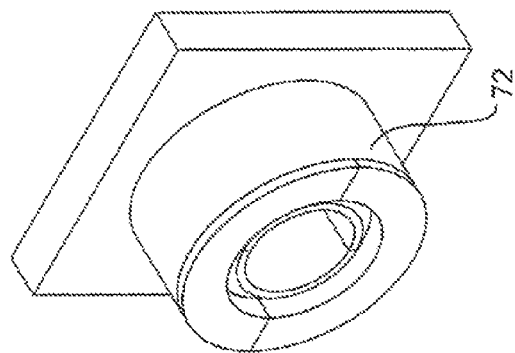
FIG. 27A shows a perspective view of the housing into which a self-adjusting embodiment of the bearing may be situated.
Figure 27C:
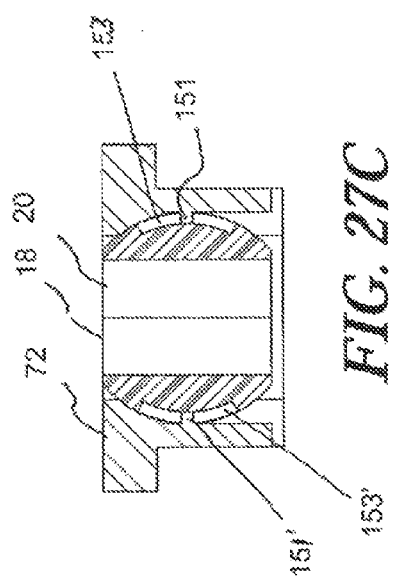
FIG. 27C shows a cross section of the housing of FIG. 27A along section lines A-A.
Figure 27B:
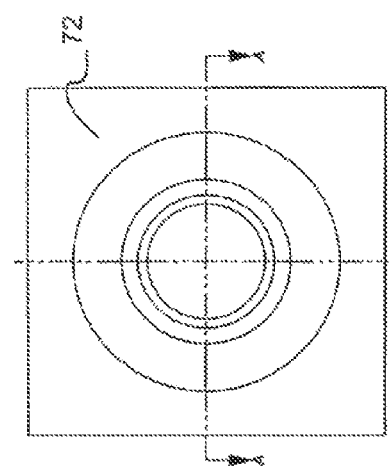
FIG. 27B shows a front view of the housing of FIG. 27A with section lines A-A and section lines B-B.
Figure 27D:
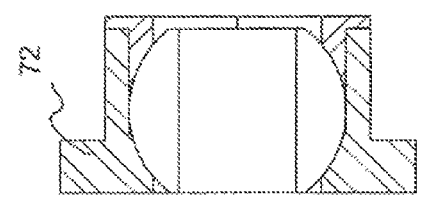
FIG. 27D shows a cross section of the housing of FIG. 27A along section lines B-B.
Figure 28A:
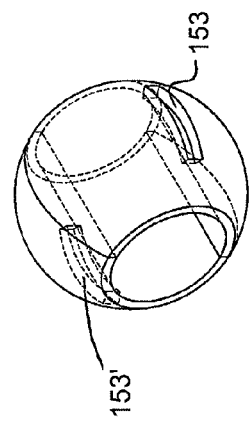
FIG. 28A shows a perspective view of a bearing of the invention.
Figure 28C:
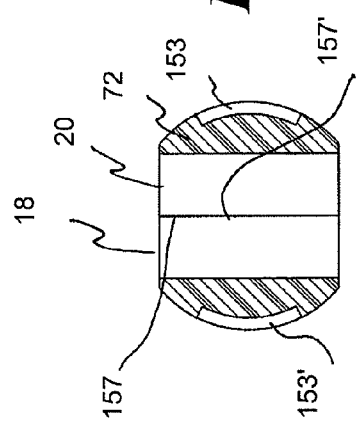
FIG. 28C shows a view of a cross section of the bearing of FIG. 28A, taken along section line A-A.
Figure 28B:
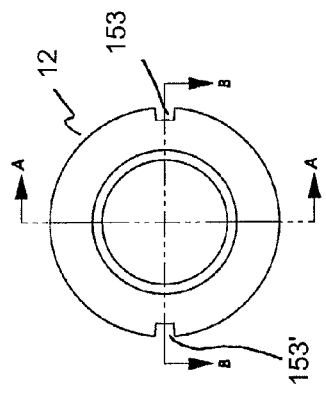
FIG. 28B shows a front plan view of the bearing of FIG. 28A with section lines A-A and section lines B-B.
Figure 28D:
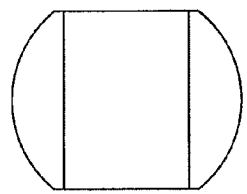
FIG. 28D shows a view of a cross section of the bearing of FIG. 28A, taken along section line B-B.

FIG. 26(*a-e*) shows an embodiment of the invention in which a groove 64 is located circumferentially in the bearing body. The groove is situated so as to combine with one or more housing channels 66 and the bearing body to enable introduction of materials, such as lubricants, into the assembly as necessary.

In some embodiments, the bearing assembly may be adapted so that the bearing is self adjusting. Referencing FIG. 27 (*a-d*) and FIG. 28 (*a-d*), respectively, a self-adjusting bearing assembly including housing (72) and a bearing body is shown. The housing (72) includes at least two buttons (151 and 151'), each of which extends from an interior surface (155) of the housing (72) into a groove or cavity (153 and 153') located in the split bearing portions (18, 20) of the bearing body (12) The button(s) may be formed integrally to the housing integral or may be formed separated and affixed to the interior surface of the housing. The buttons are adapted to permit the bearing body to tiltably rest in the housing and facilitates self alignment of the bearing body during use. The cavity or groove (153 or 153') may be of any geometry. However, in some embodiments, it is preferred that the cavity or groove is substantially shaped like an actuate rectangular prism wherein a plane defined by the a tangent of the longest side of the prism is substantially parallel to a plane defined by the edges (157, 157') of each split bearing body portions (18, 2).

FIG. 28(*a-d*) a shows a bearing body (12) suitable for use in the self adjusting assembly described above. A front view of the bearing body, showing the grooves (153 and 153') is provided in FIG. 28*b*.

In one embodiment, the invention includes an air-cooled heat exchanger, which includes a bearing assembly 10 as described herein above. Suitable air-cooled heat exchangers that may be used with the bearing assemblies of the invention are sold commercially by Hudson Products Corporation of Houston, Tex. It should be understood, however, that many other similar heat exchanges and heating and cooling equipment and industrial components could benefit from the design of the bearing assemblies herein.

The invention also includes a method of manufacturing an air-cooled heat exchanger, such as the air-cooled heat exchangers and similar devices noted above. The method includes providing to the air-cooled heat exchanger a bearing assembly such as bearing assembly 10 described herein.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A bearing assembly comprising a bearing and at least one rotary seal assembly comprising an energizing component,
   wherein the bearing has: a split bearing body split along an axial direction that comprises material chosen from a composite or a thermoplastic, and at least one recess configured for receiving the at least one rotary seal assembly, and
   wherein the at least one rotary seal assembly is a split spring-energized seal assembly that comprises:
      a seal assembly body having a first seal assembly body portion and a second seal assembly body portion, the first seal assembly body portion and the second seal assembly body portion each having a generally semi-circular cross-sectional configuration when viewed in an axial direction of the bearing assembly so that when the first and the second seal assembly body portions are joined to form the seal assembly body, they also form a generally circular cross-sectional configuration in the axial direction of the bearing assembly and
   wherein the seal assembly body portions are shaped to define a groove within each of the
   first and the second seal assembly body portions, wherein the grooves in the first and the second seal assembly body portions together are configured to meet in generally facing engagement;
      a spring element configured to be received within the grooves, the spring element having an opening configured to receive the energizing component, wherein
   the energizing component that is sized to fit within the opening in the spring element within the grooves in the first and the second seal assembly body portions to form a ball-and-socket o-ring configuration within the split metal spring-energized seal assembly and the energizing component comprises an elastomeric material.

2. The bearing assembly of claim 1, wherein the energizing component is an o-ring.

3. The bearing assembly of claim 1, wherein the elastomeric material is chosen from a nitrile rubber, a hydrogenated nitrile rubber, a fluoroelastomer, a tetrafluoroethylene/propylene rubber, a perfluoroelastomer, and copolymers thereof.

4. The bearing assembly of claim 1, wherein the bearing body comprises a material chosen from polytetrafluoroethylene, polyimide, polyarylene ketones, polyamides, polyetherimides, polyetheramides, polysulfones, polyethersulfones, and derivatives and copolymers thereof.

5. The bearing assembly of claim 1, wherein the bearing body comprises a polyarylene ketone chosen from polyether ketone, polyether ether ketone, and polyether ketone ketone.

6. The bearing assembly of claim 5, wherein the bearing body comprises polytetrafluoroethylene or polyetherimide.

7. The bearing assembly of claim 1, comprising at least two recesses configured for receiving a rotary seal assembly.

8. The bearing assembly of claim 7, comprising at least two rotary seal assemblies.

9. The bearing assembly of claim 1, wherein the at least one recess in the bearing body has an enlarged width, measured in the axial direction of the bearing assembly, that accommodates an enlarged joining area in the seal assembly body.

10. The bearing assembly of claim 1, wherein the bearing is self-adjusting.

11. An air-cooled heat exchanger comprising a bearing assembly that comprises a bearing and at least one rotary seal assembly comprising an energizing component,
  wherein the bearing is self-adjusting and has: a split bearing body split along an axial direction that comprises material chosen from a composite or a thermoplastic, and at least one recess configured for receiving the at least one rotary seal assembly, and
  wherein the at least one rotary seal assembly is a split spring-energized seal assembly that comprises:
    a seal assembly body having a first seal assembly body portion and a second seal assembly body portion, the first seal assembly body portion and the second seal assembly body portion each having a generally semi-circular cross-sectional configuration when viewed in an axial direction of the bearing assembly so that when the first and the second seal assembly body portions are joined to form the seal assembly body, they also form a generally circular cross-sectional configuration in the axial direction of the bearing assembly and
  wherein the seal assembly body portions are shaped to define a groove within each of the
  first and the second seal assembly body portions, wherein the grooves in the first and the second seal assembly body portions together are configured to meet in generally facing engagement;
    a spring element configured to be received within the grooves, the spring element having an opening configured to receive the energizing component, wherein
  the energizing component that is sized to fit within the opening in the spring element within the grooves in the first and the second seal assembly body portions to form a ball-and-socket o-ring configuration within the split metal spring-energized seal assembly and the energizing component comprises an elastomeric material.

12. A method of manufacturing an air cooled heat exchanger comprising providing to the air cooled heat exchanger a bearing assembly that comprises a bearing and at least one rotary seal assembly comprising an energizing component,
  wherein the bearing is self-adjusting and has: a split bearing body split along an axial direction that comprises material chosen from a composite or a thermoplastic, and at least one recess configured for receiving the at least one rotary seal assembly, and
  wherein the at least one rotary seal assembly is a split spring-energized seal assembly that comprises:
    a seal assembly body having a first seal assembly body portion and a second seal assembly body portion, the first seal assembly body portion and the second seal assembly body portion each having a generally semi-circular cross-sectional configuration when viewed in an axial direction of the bearing assembly so that when the first and the second seal assembly body portions are joined to form the seal assembly body, they also form a generally circular cross-sectional configuration in the axial direction of the bearing assembly and
  wherein the seal assembly body portions are shaped to define a groove within each of the
  first and the second seal assembly body portions, wherein the grooves in the first and the second seal assembly body portions together are configured to meet in generally facing engagement;
    a spring element configured to be received within the grooves, the spring element having an opening configured to receive the energizing component, wherein
  the energizing component that is sized to fit within the opening in the spring element within the grooves in the first and the second seal assembly body portions to form a ball-and-socket o-ring configuration within the split metal spring-energized seal assembly and the energizing component comprises an elastomeric material.

* * * * *